(12) United States Patent
Nowak et al.

(10) Patent No.: US 12,197,380 B2
(45) Date of Patent: Jan. 14, 2025

(54) ARCHIVING SYSTEM AND METHOD FOR ARCHIVING ELECTRONIC DATA

(71) Applicant: Glatt GmbH, Binzen (DE)

(72) Inventors: Reinhard Nowak, Loerrach (DE); Mirko Nowak, Loerrach (DE)

(73) Assignee: Glatt GmbH, Binzen (DE)

( * ) Notice: Subject to any disclaimer, the term of this patent is extended or adjusted under 35 U.S.C. 154(b) by 28 days.

(21) Appl. No.: 17/625,497

(22) PCT Filed: Jun. 18, 2020

(86) PCT No.: PCT/EP2020/066906
§ 371 (c)(1),
(2) Date: Jan. 7, 2022

(87) PCT Pub. No.: WO2021/004744
PCT Pub. Date: Jan. 14, 2021

(65) Prior Publication Data
US 2022/0269646 A1 Aug. 25, 2022

(30) Foreign Application Priority Data

Jul. 9, 2019 (DE) .................. 10 2019 210 085.6

(51) Int. Cl.
*G06F 16/00* (2019.01)
*G06F 16/11* (2019.01)
*G06F 16/13* (2019.01)
*G06F 16/22* (2019.01)
*G06F 16/93* (2019.01)

(52) U.S. Cl.
CPC .......... *G06F 16/113* (2019.01); *G06F 16/125* (2019.01); *G06F 16/134* (2019.01); *G06F 16/22* (2019.01); *G06F 16/93* (2019.01)

(58) Field of Classification Search
CPC ...... G06F 16/125; G06F 16/113; G06F 16/93; G06F 11/0763; G06F 11/079; G06F 16/134; G06F 16/22; H04L 9/3242; H04L 9/3239; H04L 63/06; H04L 63/10; H04L 63/20;
(Continued)

(56) References Cited

U.S. PATENT DOCUMENTS 5,191,534 A * 3/1993 Orr .................... G06Q 10/0875
705/29
5,757,357 A * 5/1998 Grande .................. G01R 19/25
345/440.1

(Continued)

FOREIGN PATENT DOCUMENTS

CA 2618135 A1 * 2/2007
DE 102016120132 A1 4/2018
(Continued)

OTHER PUBLICATIONS

D. Makowski et al., "High-Performance Image Acquisition and Processing System with MTCA.4", IEEE Transactions on Nuclear Science (vol. 62, Issue: 3, May 2015, pp. 925-931).*

(Continued)

*Primary Examiner* — Srirama Channavajjala
(74) *Attorney, Agent, or Firm* — The Webb Law Firm

(57) ABSTRACT

An archiving system for archiving electronic data in memory of the archiving system in an audit-proof manner and a related method for archiving electronic data on the archiving system.

7 Claims, 3 Drawing Sheets

(58) Field of Classification Search
CPC .......... G05B 9/03; G06Q 50/10; G06T 11/60; G06T 19/06
See application file for complete search history.

(56) References Cited

U.S. PATENT DOCUMENTS

| | | | |
|---|---|---|---|
| 8,208,690 B2* | 6/2012 | Tokuse | G06V 40/173 382/173 |
| 9,135,403 B1* | 9/2015 | Tolmosoff | G07F 11/165 |
| 9,195,665 B2* | 11/2015 | Lillibridge | G06F 16/113 |
| 10,223,543 B1 | 3/2019 | Mohen et al. | |
| 10,922,957 B2* | 2/2021 | Rhoads | H04N 1/00307 |
| 10,956,362 B1* | 3/2021 | Sharp | G06F 16/113 |
| 2006/0116567 A1* | 6/2006 | Nilsen | G06T 11/005 600/407 |
| 2007/0174362 A1 | 7/2007 | Pham et al. | |
| 2009/0199301 A1 | 8/2009 | Chandrasekaran et al. | |
| 2010/0060452 A1 | 3/2010 | Schuster et al. | |
| 2011/0018998 A1* | 1/2011 | Guzik | H04W 4/80 348/143 |
| 2011/0298901 A1 | 12/2011 | Derrien et al. | |
| 2013/0290810 A1* | 10/2013 | Kobayashi | G11B 20/1803 714/764 |
| 2014/0047064 A1* | 2/2014 | Maturana | G06N 7/01 709/217 |
| 2014/0365598 A1* | 12/2014 | Torpey | G06F 3/065 709/213 |
| 2015/0227943 A1 | 8/2015 | Radomsky | |
| 2015/0261015 A1* | 9/2015 | Han | G02C 9/04 351/158 |
| 2016/0012577 A1 | 1/2016 | Oka et al. | |
| 2016/0260161 A1* | 9/2016 | Atchley | G06Q 50/40 |
| 2017/0063551 A1 | 3/2017 | Quinn et al. | |
| 2018/0012077 A1 | 1/2018 | Laska et al. | |
| 2018/0260446 A1* | 9/2018 | Shoham | G06N 20/00 |
| 2018/0343385 A1* | 11/2018 | Mimura | H04N 23/80 |
| 2019/0132709 A1* | 5/2019 | Graefe | G08G 1/096716 |
| 2019/0204814 A1 | 7/2019 | Birchbauer et al. | |
| 2019/0228272 A1* | 7/2019 | Shen | G06T 7/80 |
| 2019/0240703 A1 | 8/2019 | Kiefer et al. | |
| 2019/0333182 A1* | 10/2019 | Namiki | G06T 1/60 |
| 2020/0114607 A1* | 4/2020 | Pillarisetty | B23Q 17/248 |
| 2020/0310368 A1* | 10/2020 | McLaughlin | G05B 19/4185 |

FOREIGN PATENT DOCUMENTS

| | | |
|---|---|---|
| DE | 202018106629 U1 | 2/2019 |
| EP | 1403782 A2 * | 3/2004 |
| JP | 2011209792 A | 10/2011 |
| JP | 2012141807 A | 7/2012 |
| WO | 2014028959 A1 | 2/2014 |
| WO | WO 2015191444 A2 * | 12/2015 |
| WO | WO 2018066563 A1 * | 4/2018 |

OTHER PUBLICATIONS

Marsh, Jacqueline L.; Eyers, Daniel R. Increasing production efficiency through electronic batch record systems: a case study. In: International Conference on Sustainable Design and Manufacturing. Springer, Cham, 2016. S. 261-269.

Petersen, Nils; Pagani, Alain; Stricker, Didier. Real-time modeling and tracking manual workflows from first-person vision. In: 2013 IEEE International symposium on mixed and augmented reality (ISMAR). IEEE, 2013. S. 117-124.

"Doxis4: Everything from an electronic archive to a content repository", SER Group, pp. 1-7, https://web.archive.org/web/20180907150808/https://www.ser-solutions.com/products-solutions/archiving.html, retrieved on Nov. 11, 2023 using The Wayback Machine.

* cited by examiner

ARCHIVING SYSTEM AND METHOD FOR ARCHIVING ELECTRONIC DATA

CROSS-REFERENCE TO RELATED APPLICATIONS

This application is the United States national phase of International Application No. PCT/EP2020/066906 filed Jun. 18, 2020, and claims priority to German Patent Application No. 10 2019 210 085.6 filed Jul. 9, 2019, the disclosures of which are hereby incorporated by reference in their entirety.

BACKGROUND

Field

The invention relates to an archiving system for the archiving of electronic data, wherein the archiving system comprises memory means for storing electronic data, a data processing system for processing the electronic data and a working step acquisition system for acquiring working steps which are carried out in a process, wherein the working step acquisition system is connected to the data processing system and to the memory means via communication means for data transfer, and wherein the data processing system is configured to convert the working steps which are acquired by the working step acquisition system into electronic data.

Furthermore, the invention relates to a method for archiving electronic data.

Furthermore, the invention relates to the use of an archiving system for archiving electronic data in the pharmaceutical industry.

Related Art

Archiving systems and methods for archiving electronic data have been known from the state of the art for some time. In particular, data is digitalised, and this is subsequently stored on a computer. It is therefore the object of the invention to provide a method and a device for an audit-proof archiving of electronic data, in particular for methods and processes in the pharmaceutical industry, said method and device permitting the avoidance of masses of paper which are otherwise necessary for documentation of this type and to some part can take up whole rooms, and thus given a simultaneous reduction of costs and storage space taking care of the environment. Concerning an archiving system of the initially mentioned type, this object is achieved in that the archiving system is configured to archive the electronic data on the memory means of the archiving system in an audit-proof manner. The term audit-proof relates to the audit-proof archiving for electronic archiving systems. The term is hereby orientated to the understanding of audit from an economic point of view and relates to information and documents which are obliged to be kept and worthy of being retained.

Archived in an audit-proof manner in this context hence basically means that the stored data is protected from a later modification, for example by a user and there is no manipulation of the data in the archiving system. Simultaneously, the data is archived in the archiving system in an understandable, locatable, unchangeable and adulteration-proof manner. The demands of an audit-proof archiving are set in the principles for the orderly management and safekeeping of books, drawings and document in electronic form as well as for data access (GoBD). An audit-proof archiving encompasses the term of audit-security. This relates to the ability of the applied method to be examined and comprises:
  a) the proof of a method documentation
  b) the orderly use
  c) the secure procedure
  d) the secure operation and
  e) the organisation of the user company.

Audit-security is therefore not limited to the technology or a software, but always encompasses the complete method of the archiving. The ten principles for audit-security of electronic data are defined as follows:
  1) All data (E-documents) is archived in the archiving system in a non-changeable manner.
  2) Electronic data may not get lost on the way to the archiving system or even in the archiving system itself.
  3) All electronic data must be retrievable with suitable techniques (e.g., by way of indexing with metadata).
  4) Precisely that data which has been searched for must be found again.
  5) Data may not be destroyed during the duration of the period for safekeeping.
  6) All data must be able to be displayed and printed again in precisely the same form as this had been acquired.
  7) All data must be able to be retrieved quickly.
  8) All actions in the archiving system which effect the changes in the organisation and structure are to be protocolled in a manner such that the reconstitution of the original state is possible.
  9) Electronic archiving systems are to be designed such that a migration to new platforms, media, software versions and components is possible without the loss of information.
  10) The archiving system must provide the user with the possibility of ensuring legal regulations (for example BDSG, HGB, AO etc.) as well as the operational regulations of the user with regard to data security and data protection over the life duration of the archiving system.

In Germany, an audit-proof archiving with respect to electronic archiving systems must meet several specifications. The legal requirements here originate from:
  a) the commercial code (paragraph 239, 257 HGB),
  b) the fiscal code (paragraph 146, 147 AO),
  c) as well as the new principles for the orderly management and safekeeping of books, drawings and documents in electronic form as well as for the data access, GoBD for short (formerly GoBS and GDPdU).

Concluding, the following criteria can be derived:
  a) Compliance
    Each document must be archived in a compliant manner according to the legal and organisation-internal demands.
  b) Completeness
    None of the archived documents are to get lost on the way into the archiving system—or also in the archiving system itself.
  c) Understandability
    The protocolling of each changing action must be deposited in the electronic archiving system in an understandable manner.
  d) Examining ability
    The complete method (organisational as well as technical) of the archiving must be able to be examined at all times by an expert third party.
  e) Security of the whole method
    All data must be archived at the earliest organisational point in time.

f) Protection from modification and adulteration
   All electronically archived data must correspond to the original data.
g) Securing against loss
   All data must be retrievable and at the same time reproducible.
h) Use only by authorised persons
   Only authorised users may view the archived data.
i) Maintaining the safekeeping deadlines
   The data may only be destroyed out of the archiving system at the earliest after completion of the deadline for safekeeping.
j) Documentation of the method
   The maintaining of all previously specified principles and furthermore possible changes in the archiving system must always be documented.

SUMMARY

An archiving system which comprises an audit-proof archiving has the advantage that all steps of a method, wherein these are monitored at all times for example by state authorities and can be examined at all times, such as e.g. the manufacture of medications in the pharmaceutics industry, are archived in a manipulation-proof manner. Such an archiving system furthermore has the advantage that masses of paper which are otherwise necessary for the documentation of this type and to some extent can take up whole rooms no longer occurs, so that one the one hand the environment is taken care of and on the other hand costs and storage area for the paper can be saved. Preferably, the data processing system comprises the memory means. The memory means is preferably a common data memory, such as for example a hard disc or the like. The electronic data is preferably deposited in a so-called batch record. Advantageously, the working steps of a process which are to be carried out are stored as working step desired value data and/or components which are necessary for the working step of a process which is to be carried out are stored as component desired value data and/or the mass of an ingredient (component) which is to be metered are stored as weight desired value data and/or component storage locations of components are stored as component storage location desired value data, on the memory means of the archiving system in the form of electronic data. According to an additional embodiment of the archiving system, the archiving system comprises an acquisition system which is designed as a component acquisition unit or as a weight acquisition unit, wherein the component acquisition unit and/or the weight acquisition unit is connected to the data processing system and the memory means via communication means for data transfer. The component acquisition unit is preferably configured for acquiring component raw data, wherein the component raw data are the components which are present for the working step of a process which is to be carried out, and/or the weight acquisition unit is preferably configured for acquiring weight raw data, wherein the weight raw data (mass raw data) represents the weight of a component or of an ingredient, which is to be processed for the working step of a process which is to be carried out.

Particularly preferably the working step acquisition unit, the component acquisition unit and/or the weight acquisition unit are designed as an acquisition system or as parts of an acquisition system. The acquisition system and/or the working step acquisition unit and/or the component acquisition unit and/or the weight acquisition unit are designed as a sensor, preferably as an optical sensor, particularly preferably a camera, most preferably as a video camera. By way of such acquisition systems, the individual working steps and/or the individual components and/or the mass of the components (ingredients) can be acquired in a precise manner and the acquired data can be deposited or stored in the archiving system in an audit-proof manner.

The data processing system is preferably configured to convert the component raw data into component actual value data in the form of electronic data. The data processing system of the archiving system can convert the data which is acquired by the acquisition system into electronic data, such as for example pictures or films, which can be evaluated later.

The archiving system further comprises comparator means which are connected to the data processing system via communication means for data transfer. Preferably, the comparator means are configured for the comparison of the actual value data and the desired value data, in particular the working step actual value data and the working step desired value data and/or component actual value data and the component desired value data and/or weight actual value data and weight desired value data. In a preferred variant, the data processing system comprises the comparator means.

According to an advantageous embodiment, the archiving system comprises evaluation means which are connected to the data processing system via communication means for the data transfer. Preferably, the evaluation means are configured for the evaluation of the comparison which is effected by the comparator means. The evaluation means are optimally configured to provide an evaluation result, in particular a working step evaluation result and/or a component evaluation result and/or a weight evaluation result, by way of the evaluation. Particularly preferably, the data processing system comprises the evaluation means.

According to an additional advantageous embodiment, the archiving system comprises a display system which is connected to the data processing system via communication means for data transfer and which comprises a display unit. According to a particularly advantageous embodiment, the display system is designed as a monitor and/or smartglasses. Further advantageously, the display system is configured for the display of the evaluation result, which is provided by the evaluation means, preferably the working step evaluation result and/or the component evaluation result and/or the weight evaluation result and/or the location evaluation result.

It is advantageous that the data which is acquired by the acquisition system can be compared with data which for example is already stored on the memory means of the archiving system and evaluated, by way of the comparator means and evaluation means of the archiving system, so that evaluation results are available in the archiving system for further processing and for the audit-proof archiving. According to a further development of the archiving system, the archiving system comprises a position acquisition means which is connected to the data processing system via communication means for the data transfer, for acquiring a current location of an operating person. Accordingly, the archiving system is configured to display a path to the component storage space on the display system. By way of this, it is possible for the operating person, for example given the absence of a component, to be shown the quickest and/or shortest path to closest component by way of the display system, so that a time loss in the production where possible does not occur. Furthermore, concerning a method of the initially mentioned type, the object is achieved in that the method for archiving electronic data comprises an archiving system, wherein the archiving system comprises memory means for storing electronic data, a data processing system for processing electronic data and an acquisition system which is designed as a working step acquisition unit, for the acquisition of working step raw data, wherein the working step raw data are the working steps which are carried out in a process, and wherein the working step acquisition unit is connected to the data processing system and to the memory means via communication means for data transfer, and wherein the data processing system for this is configured to convert the working step raw data which is acquired by the working step acquisition unit into working step actual value data in the form of electronic data, the method comprising the steps of an acquisition of the implemented working steps in the form of working step raw data of a process by way of the working step acquisition system, a converting of the acquired working step raw data of a process into working step actual value data in the form of electronic data, a transfer of the working step actual value data to the memory means and an audit-proof archiving of the working step actual value data on the memory means of the archiving system.

A method with an archiving system for the audit-proof archiving has the advantage that all method steps, wherein these can be monitored for example by state authorities, and it can be examined at all times as to how e.g., the composition of components which are applied in the pharmaceutical industry, such as nozzles or the like, are archived in a manipulation-proof manner. Such a method furthermore has the advantage that masses of paper which are otherwise necessary for such a documentation and can partly take up whole rooms no longer occur, so that on the one hand the environment is protected and on the other hand costs and storage area for the paper can simultaneously be saved.

In an embodiment of the method in respect of this, working step desired value data of a process is stored as electronic data on the memory means of the archiving system, the archiving system comprises comparator means for the comparison of the stored working step desired value data and working step actual value data, and the archiving system comprises evaluation means for evaluating the comparison of the working step desired value data and working step actual value data of a process, said comparison being effected by the comparator means, said method comprising the steps of an execution of a comparison of the working step desired value data and working step actual value data of a process, an evaluating of the comparison of the working step desired value data and working step actual value data, said comparison being effected by the comparator means, and providing of a working step evaluation result. According to a further development of the method, component desired value data and/or weight desired value data is stored on the memory means, said method comprising the steps of transferring the component actual value data and/or weight actual value data to the data processing system, carrying out a comparison of the component desired value data and/or weight desired value data and the component actual value data and/or weight actual value data of a process, evaluating of the comparison of the component desired value data and component actual value data and/or the weight desired value data and the weight actual value data, of a process, said comparison being effected by the comparator means, and providing of a component evaluation result.

Preferably, the archiving system comprises a component acquisition unit and/or a weight acquisition unit, the method comprising the step of acquiring component raw data and converting the component raw data into component actual value data in the form of electronic data and/or acquiring weight raw data and converting the weight raw data into weight actual value data in the form of electronic data. Particularly preferably, component desired value data and/or weight desired value data is stored on the memory means, the method comprising the steps of transferring the component actual value data and/or weight actual value data to the data processing system, carrying out a comparison of the component desired value data and/or the weight desired value data and component actual value data and/or weight actual value data of a process, evaluating the comparison of the component desired value data and/or weight desired value data and component actual value data and/or weight actual value data of a process, said comparison being effected by the comparator means, and providing a component evaluation result and/or a weight evaluation result.

This has the advantage that the working step evaluation result as well as the component and/or weight evaluation result can be used for further processing.

According to a further development of the method, the archiving system comprises a display system for the display of the evaluation result which is provided by the evaluation means, preferably of the working step evaluation result and/or of the component evaluation result and/or of the component storage place which is stored on the memory means for the necessary components, said method comprising the step of displaying the evaluation result which is provided by the evaluation means, on the display system.

Advantageously, the archiving system comprises position acquisition means for acquiring a current location of an operating person, the method comprising the step of displaying a path from the current location of the operating person to the component storage space. By way of this, it is possible, for example given the absence of a component, for the quickest and/or shortest path to the closest component to be displayed by the display system to the operating person, so that a time loss in production wherever possible does not occur.

Particularly advantageously, the individual electronic data which is produced in the method steps is archived in an audit-proof manner. Furthermore, the use of an archiving system for archiving electronic data is advantageous in the pharmaceutics industry, wherein the archiving system is an archiving system according to the embodiments described herein.

BRIEF DESCRIPTION OF THE DRAWINGS

The invention is hereinafter explained in more detail by way of the accompanying drawings, these showing FIG. 1 a basic flow diagram of a preferred archiving system for the audit-proof archiving of electronic data for use on assembling facility components, FIG. 2 a basic flow diagram of a preferred archiving system for the audit-proof archiving of electronic data for use on weighing in ingredients of medications and FIG. 3 a basic flow diagram of a preferred archiving system for the audit-proof archiving of electronic data for use in pharmaceutical logistics.

DETAILED DESCRIPTION

Figure 1:
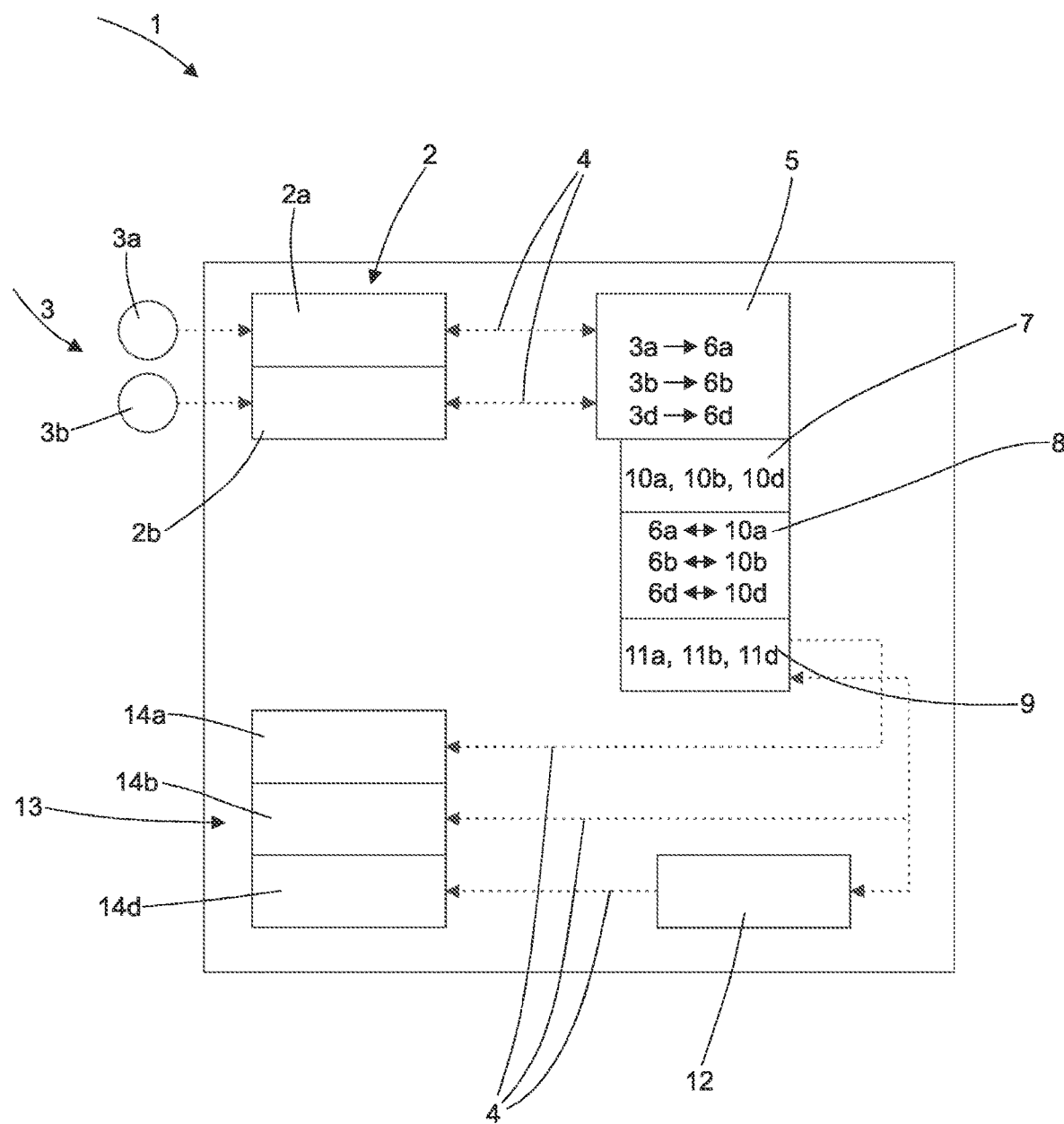

FIG. 1 shows a basic flow diagram of a preferred archiving system for the audit-proof archiving of electronic data for use on assembling facility parts.

The archiving system 1 comprises an acquisition system 2 which is comprises a working step acquisition unit 2a and a component acquisition unit 2b. The acquisition system 2, in particular the working step acquisition unit 2a and component acquisition unit 2b is preferably designed as a sensor, particularly preferably as an optical sensor, very particularly preferably as a camera, in particular as a video camera.

In the most preferred form, the acquisition system 2, in particular the working step acquisition unit 2a is designed as smartglasses which comprise a video camera. By way of this, the working step acquisition unit 2a recognises the working steps which are carried out by an operating person in the acquisition field of the working step acquisition unit 2a for example at his workplace. A location-fixed, stationary installation of the acquisition system 2 is also conceivable, for example as a camera which is arranged on the body (bodycam), wherein preferably the component acquisition unit 2b is designed in such a fashion. By way of this, it is advantageously always possible to acquire the components which are available at the workplace to the operating person for the individual working steps.

The acquisition system 2 which is shown in the embodiment example, with the working step acquisition unit 2a and the component acquisition unit 2b comprises two acquisition systems 2 which as video cameras are independent of one another. The acquisition system 2 is suitable for acquiring raw data 3, in particular for acquiring working step raw data 3a and component raw data 3b.

The working step raw data 3a and component raw data 3b which is detected by the working step acquisition unit 2a and component acquisition unit 2b is transferred to a data processing system 5 via communication means 4, such as for example a data transmission cable, strip conductors, radio networks or the like, wherein the data processing system 5 is configured to convert the raw data 3 which is acquired by the acquisition system 2 into acquired, electronic actual value data 6. Hereby, the working steps raw data 3a is converted into acquired, electronic working step actual value data 6a and the component raw data 3b into acquired, electronic component actual value data 6b.

In the embodiment example, the data processing system 5 of the archiving system 1 comprises memory means 7, comparator means 8 and evaluation means 9.

On the one hand the electronic actual value data 6 which is obtained by the conversion from the raw data, in particular the working step actual value data 6a and the component actual value data 6b can be stored on the memory means 7, in particular on the batch records which are designed at least as part of the memory means, and on the other hand further electronic data can be additionally deposited on the memory means 7. For example, all types of documents, in particular however desired value data 10, preferably working step desired value data 10a which is to be worked off by an operating person on assembling the facility component, here a nozzle, belong to this further electronic data. Likewise, there is the possibility of storing a list of the components which are necessary on assembly, preferably of the components which are necessary for each working step, as component desired value data 10b on memory means 7 as stored, electronic desired value data 10. Component storage location data 10d can also be stored on the memory means 7 as electronic data.

All raw data 3, actual value data 6 and desired value data 10 as well as additional electronic data is archived in the preferred archiving system 1 in a non-changeable manner. Hereby, all data, in particular the raw data 3 and the actual value data 6 and desired value data 10 are stored on the memory means 7 and for the indexation are provided for example with metadata for the unambiguous identification, so that the electronic data can be retrieved again at all times during the duration of the safekeeping period. All electronic data must be able to be displayed and printed on retrieval in precisely the same form as these have been acquired.

The comparator means 8 are suitable for comparing the acquired electronic actual value data 6 which is stored on the memory means 7 and the stored electronic desired value data 10 with one another. Hereby, the working step actual value data 6a is compared to the working step desired value data 10a and the component actual value data 6b with the component desired value data 10b.

The evaluation means 9 are configured to evaluate the comparison between stored, acquired electronic actual value data 6 and deposited electronic desired value data 10, said comparison being carried out in the comparator means 8, and to determine or provide an evaluation result 11. In particular, a so-called working step evaluation result 11a results from the comparison of working step actual value data 6a and working step desired value data 10a as well as a so-called component evaluation result 11b from the comparison of component actual value data 6b and component desired value data 10b.

Furthermore, the archiving system 1 of the embodiment example comprises a position acquisition means 12 for acquiring location data 6d of a current location of an operating person, said position acquisition means being connected to the data processing system 5 via communication means 4 for data transfer. However, this is not absolutely necessary. The position acquisition means 12 is suitable for providing a location evaluation result lid by way of a comparison of the location data 6c of the current location of the operating person and of the components storage location data 10d, said comparison being carried out by the comparator means and evaluation means 7, 8.

The component storage location data 10d is achieved by way of inventory of the components and an unambiguous deposition of the components, by way of microchips, in particular radio-frequency identification (RFIF) which are built on the components. Hereby, further information can also be stored with the components storage location data, such as for example status data, for example cleaned, validated or the like.

For the display of the evaluation result 11, the preferred archiving system 1 comprises a display system 13. Preferably, the display system 13 comprises display units 14, 14b and 14d which preferably reproduce the evaluation results 11, the working step evaluation result 11a, the component evaluation result 11b and the location evaluation result lid. Advantageously, for example the status data are also shown, so that the operating person always has a complete overview of the process situation. The display system 12 is preferably designed as a monitor, particularly preferably however as a smartglasses which comprise a projection surface for the display of the evaluation result 11. By way of this, it is possible for example for the working step evaluation result 11a to be displayed in the projection surface of the data, apart from the other information. The location evaluation result is preferably displayed on the display system 13 as a path to the component storage location.

The first embodiment example of a preferred method for archiving electronic data is explained by way of the assembly of a nozzle, wherein the method can analogously be applied for the archiving of electronic data on assembly of other facility parts.

On assembly of the nozzle, the operating person at his workplace wears smartglasses which are provided with a video camera, as an acquisition system 2. The acquisition system 2 as working step acquisition unit 2a and component acquisition unit 2b on the one hand acquires the working steps which are carried out by the operating person on assembly of the nozzle, as working step raw data 3a and on the other hand the components which are present at the workplace for the assembly of the nozzle, as component raw data 3b. Subsequently, the acquired raw data 3 is transferred via communication means 4 to the data processing system 5, for example to a computer or the like. The data processing system 5 converts the acquired raw data 3 into actual value data 6, specifically into working step actual value data 6a and component actual value data 6b. The raw data 3 as well as the actual value data 6 is stored on the memory means 7 which are assigned to the data processing system 5, in an audit-proof manner.

Furthermore, desired value data 10, in particular working step desired value data 10a as well as component desired value data 10b can be stored on the memory means 7.

A list of the individual working steps which are to be carried out is stored on the memory means 7 as working step data.

Preferably, pre-trained pictures of a CAD model by way of industrial picture processing software, for example Halcon 8.0 of MVTec Software GmbH are used as component desired value data 10b. The software recognises 3D-objects in space in arbitrary positions and orientations by way of shape-based matching, thus by way of a comparison with a pre-trained CAD model.

Comparator means 8 access the actual value data 6, working step actual value data 6a and component actual value data 6b which is stored on the memory means and is obtained from the raw data 3, and compare this to the desired value data 10, working step desired value data 10b and component desired value data 10b. The comparison is subsequently evaluated in the evaluation means 9 and an evaluation result 11 is provided in the form of a working step evaluation result 11a and a component evaluation result 11b. A positive evaluation result 11 confirms an error-free working procedure to the operating person, in contrast to a negative evaluation result 11. If the working step evaluation result 11a is positive, then the individual working step was carried out correctly, for example all parts are correctly built on one another. If the component evaluation result 11b is positive, then adequate components for the working step which is to be carried out on assembly of the nozzle or for the complete assembly of the nozzle are present at the workplace.

The evaluation result 11 in the form of a working step evaluation result 11a and a component evaluation result 11b is displayed to the operating person on a display unit 14 of the display system which is designed as a projection surface of the smartglasses or as a monitor. Additionally, there is the possibility providing the operating person with an acoustic signal, for example via headphones.

Thus, it is possible for the operating person, for example by way of the display of a negative working step evaluation result 11a, to immediately recognise an error which occurs on assembly during the running process and to correct this. By way of this, each nozzle is constructed equally, and the assembly procedure is simultaneously yet deposited in the archiving system 1 in an audit-proof manner, for example for the authorities. Given an incorrect assembly of the nozzle, there is the possibility of interrupting the further assembly of the nozzle for example by way of cutting off the current to the tool which is necessary for the assembly. As soon as the correction of the assembly of the nozzle has been effected by the operating person, then the further assembly of the nozzle can be effected.

If for example by way of the display of a negative evaluation result 11b during the running process it is displayed to operating person that insufficient components for the assembly of the nozzle at the workplace of the operating person are present, then there is the possibility of the operating person obtaining these, by way of ordering or himself fetching them from the component storage. Hereby, there is also the possibility of already comparing the components for the next or the next but one operating step, so that a uninterrupted working of the operating person is made possible. At the same time, given the absence of components, an automatic ordering and delivery is likewise conceivable.

A position acquisition means 12 acquires the precise location of the operating person, for example by way of a GPS sensor which is built into the smartglasses. In the case of absent components for a working step at the workplace of the operating person, the position acquisition means 12 is suitable for providing the operating person with a location evaluation result lid by way of a comparison of the component storage location data 10d which is stored in the memory means 7 and of the location data 6d of the current location of the operating person, and of displaying a path to the respective component in the closest component storage place to the operating person.

It is possible for the operating person to retrieve the currently valid standard operating procedure (SOP) at any time during the assembly of the nozzle and of having this displayed in the display system 13. By way of the mentioned procedures, a documentation corresponding to good manufacturing practise (GMP) is ensured on assembly of the nozzle.

All data which is generated during the method is archived on the memory means 7 of the archiving system 1 in an audit-proof manner. Not only can the aforementioned method and the associated archiving system be used with the assembly of facility components, but also on assembling facilities themselves, preferably in the field of the pharmaceutical industry, since here very high demands are placed on the documentation of the data. The method can be carried out analogously to the fitting, in particular to the installation of tools, facility components, such as tablet presses, packaging machines or the like.

Figure 2:
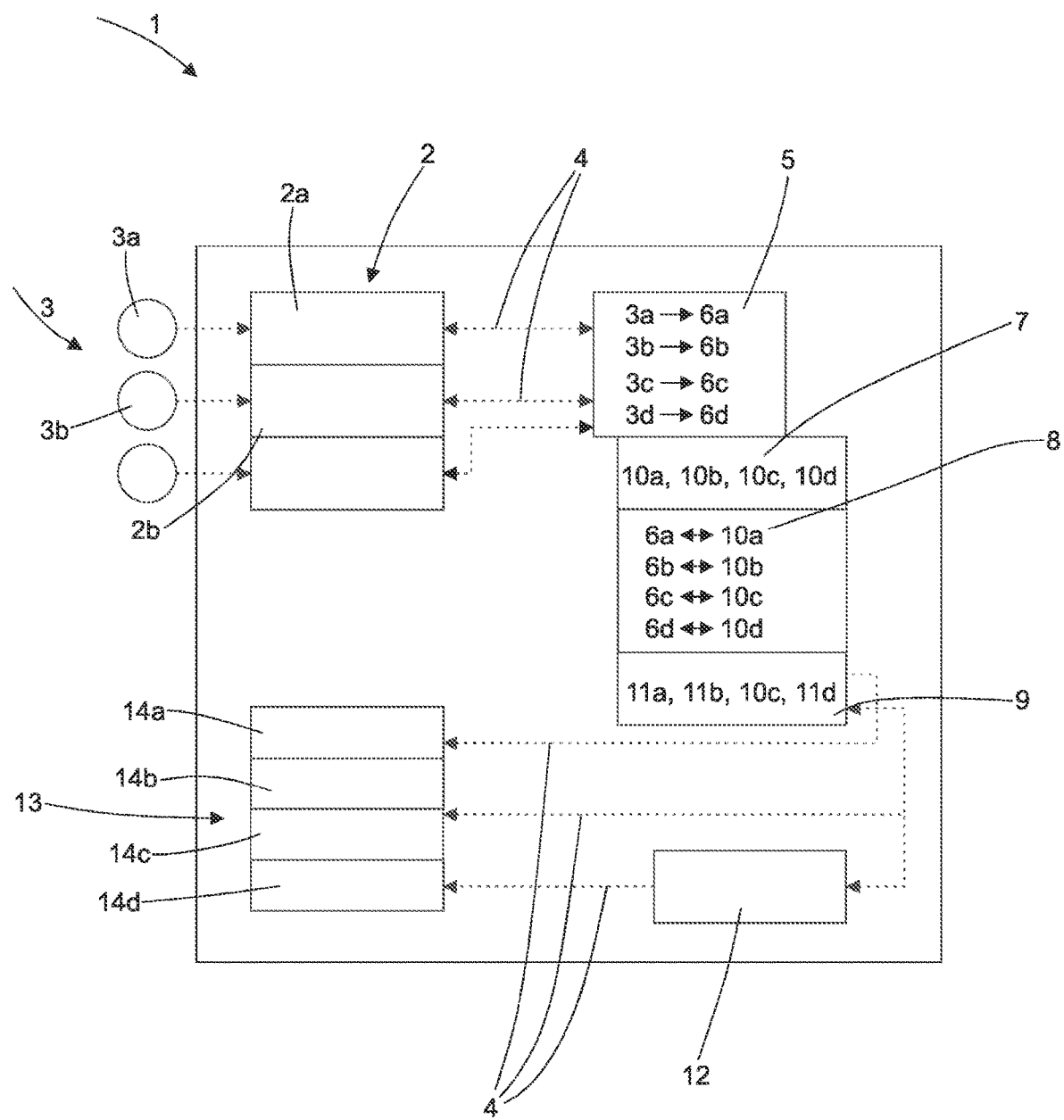

A basic flow diagram of a preferred archiving system 1 for the audit-proof archiving of electronic data for use on weighing in ingredients of medications is shown in FIG. 2.

The archiving system 1 comprises an acquisition system 2 which comprises a working step acquisition unit 2a, a component acquisition unit 2b and a weight acquisition unit 2c. The acquisition system 2, in particular the working step acquisition unit 2a, the component acquisition unit 2b and the weight acquisition unit 2c is preferably designed as a sensor, particularly preferably as an optical a sensor, very particularly preferably as a camera, in particular as a video camera. Furthermore, optionally the scales can communicate directly with the memory means 7 for a possible additional control or a second validation and/or documentation.

In the form, which is most preferred, the acquisition system 2, in particular the working step acquisition unit 2a is designed smartglasses which have a video camera. By way of this, the working step acquisition unit 2a recognises the working steps which are carried out by an operating person in the field of acquisition of the working step acquisition unit 2a for example at his workplace. The location-fixed, stationary installation of the acquisition system 2 is also conceivable, for example designed as a camera (bodycam) which is arranged on the body, wherein preferably the component acquisition unit 2b and the weight acquisition unit 2c are designed in such a manner. By way of this, it is advantageously always possible for the components which are available to the operating person at the workplace for the individual working steps to be acquired by the component acquisition unit 2b and the weight, for example of ingredients (active ingredients or adjuvants) which are weighed on scales for medication preparation, by the weight acquisition unit 2c on a weight display of the scales and/or with a label of the packaging, e.g. batch number, active ingredient, date of expiry, etc and to compare these.

The acquisition system 2 which is shown in the embodiment example, with the working step acquisition unit 2a, the component acquisition unit 2b and the weight acquisition unit 2c comprises three acquisition systems 2 which are independent of one another as video cameras. The acquisition system 2 is suitable for the acquisition of raw data 3, in particular for acquiring working step raw data 3a, component raw data 3b and weight raw data.

The working step raw data 3a, component raw data 3b and weight raw data 3c which is acquired by the working step acquisition unit 2a, the component acquisition unit 2b and the weight acquisition unit 2c is transferred to a data processing system 5 via communication means 4, such as for example data transmission cables, strip conductors, radio networks or the like, wherein the data processing system 5 is configured to convert the raw data 5 which is acquired by the acquisition system 2 into acquired, electronic actual value data 6. Hereby, the working step raw data 3a is converted into acquired, electronic working step actual value data 6a, the component raw data 3b into acquired, electronic component actual value data 6b and the weight raw data 3c into acquired electronic weight actual value data 6c.

In the embodiment example, the data processing system 5 of the archiving system according to the archiving system 1 which is described in FIG. 1 comprises memory means 7, comparator means 8 and evaluation means 9.

On the one hand the electronic actual value data 6, in particular the working step actual value data 6a, the component actual value data 6b and the weight actual value data which are obtained by the conversion from the raw data, and on the other hand additionally further electronic data can be stored on the memory means 7, in particular on the batch records which are designed at least as a part of the memory means. For example, all types of documents, in particular however desired value data 10, preferably working step desired value data 10a which is to be processed by an operating on preparing medicine, belong to this further electronic data. Likewise, there is the possibility of storing a list of the individual ingredients (components) of the medications, preferably of the ingredients which are necessary for each working step, as component desired value data 10b on the memory means 7 as deposited electronic desired value data 10. Furthermore, it is possible for the ingredients which are to be metered individually to also be stored as a weight specification. Component storage location data 10d can also be stored on the memory means 7 as electronic data.

All raw data 3, actual value data 6 and desired value data 10 as well as additional electronic data is archived in the preferred archiving system in an unchangeable manner. Hereby, all data, in particular the raw data 3 and the actual value data 6 and desired value data 10 is stored on the memory means and is provided for example with metadata for the unambiguous identification for indexing, so that the electronic data can be retrieved again at all times during the duration of the safekeeping time period. All electronic data must be able to be displayed and printed on request in precisely the same form as these have been acquired.

The comparator means 8 are suitable for comparing the acquired electronic actual value data 6 which is stored on the memory means 7 and the deposited electronic desired value data 10 with one another. Hereby, the working step actual value data 6a is compared with the working step desired value data 10a, the component actual value data 6b with the component desired value data 10b and the weight actual value data 6c with the weight desired value data 10c. The evaluation means 9 are configured to evaluate the comparison between stored, acquired electronic actual value data 6 and deposited electronic desired value data 10, said comparison being carried out in the comparator means 8, and to determine or provide an evaluation result 11. In particular, a so-called working step evaluation result 11a results from the comparison of working step actual value data 6a and working step desired value data 10a, a so-called component evaluation result 11b from the comparison of component actual value data 6b and component desired value data 10b as well as a so-called weight evaluation result 11c from the comparison of weight actual value data 6c and weight desired value data 10c.

Furthermore, the archiving system 1 comprises a position acquisition means 12 which is connected to the data processing system 5 via communication means 4 for the data transfer, for acquiring location data 6d of a current location. The position acquisition means 12 is suitable for providing a location evaluation result lid by way of a comparison of location data 6d of the current location of the operating person and of the component storage location data 10d, said comparison being carried out in particular by the comparator means 7 and evaluation means 8.

The component storage location data 10d is achieved for example by the inventory of the components and an unambiguous deposition of the components, by way of microchips, in particular radio-frequency identification (RFID) which are built on the components. Hereby, further information can be stored with the component storage location data, such as for example status data, for example cleaned, validated or the like.

For the display of the evaluation result 11, the preferred archiving system 1 comprises a display system 13. Preferably, the display system 13 comprises display units 14a to 14d which preferably reproduce the evaluation results 11, in particular the working step evaluation result 11a, the component evaluation result 11b, the weight evaluation result 11c and the location evaluation result lid. Advantageously for example the status data is also displayed, so that the operating person always has a complete overview of the process situation. The display system 12 is preferably designed as a monitor, particularly preferably however as a smartglasses which comprises a projection surface for the display of the evaluation result 11. By way of this, it is possible, apart from other information, for example to display working step evaluation result 11a, the component evaluation result 11b and the weight evaluation result 11c in the projection surface of the smartglasses. The location evaluation result is preferably displayed on a display system 13 as a path to the component storage location.

The second embodiment example of a preferred method for archiving electronic data is explained on the basis of a weighing in of ingredients (components) of medication.

On weighing in medications, the operating person at his workspace wears smartglasses as an acquisition system 2, said smartglasses being provided with a video camera. The acquisition system 2 as a working step acquisition unit 2a, component acquisition unit 2b and weight acquisition unit 2c on the one hand acquires the working steps which are carried out by the operating person on weighing in, as working step raw data 3a, and on the other hand the ingredients (components) which are present at the workplace, such as active ingredients and adjuvants, as component raw data 3b and the weight (mass) of the respective ingredients, as soon as these have been weighed on scales for metering, as weight raw data.

Subsequently to this, the acquired raw data 3 is transferred to a data processing system 5, for example to a computer or the like via communication means 4. The data processing system 5 converts the acquired raw data 3 into actual value data 6, specifically into working step actual value data 6a, component actual value data 6b and weight actual value data 6c. The raw data 3 as well as the actual value data 6 are stored on the memory means 7 which are assigned to the data processing system, in an audit-proof manner. Furthermore, desired value data 10, in particular working step desired value data 10a as well as component desired value data 10b and weight desired value data 10c is stored on the memory means 7. Preferably, a list of the individual working steps which are to be carried out is stored on the memory means 7 as working step data. Concerning the second embodiment example, there is further the possibility of specifying the working steps without a fixed sequence, so that the operating person can freely decide on the sequence of the addition of the ingredients on preparing medication. Preferably, pre-trained pictures of the respective ingredient are used as component desired value data 10b and preferably the masses of the individual ingredients which are also designated as components are used as weight desired value data 10c.

Comparator means 8 access the actual value data 6 which is obtained from the raw data 3 and is stored in the memory means 7 and compares this to the desired value data 10. The comparison is subsequently evaluated in the evaluation means 8 and an evaluation result 11 is provided in the form of a working step evaluation result 11a, a component evaluation result 11b and weight evaluation result 11c. A positive evaluation result 11 in contrast to a negative evaluation result 11 confirms a correct working procedure to the operating person. If the working step evaluation result 11a is positive, the individual working step was carried out correctly, for example all ingredients admetered correctly, preferably even in the correct sequence. If the component evaluation result 11b is positive, then adequate ingredients (components) for the preparation of medication (weigh-in) are present at the workplace of the operating person for the working step which is to be carried out.

The evaluation result 11 in the form of a working step evaluation result 11a, component evaluation result 11b and a weight evaluation result 11c is displayed to the operating person on a display unit 14 of the display system 13 which is designed as a projection surface of the smartglasses or as a monitor. Different display systems 13 or different display units 14 are conceivable.

Thus, during the running process, it is possible for the operating person, for example by way of the display of a negative working step evaluation result 11a, to immediately recognise an error and to correct this or to remove the incorrectly prepared ingredient weight out of the production. By way of this, each medication is manufactured with a constant quality and the medication weight is simultaneously deposited in the archiving system 1 in an audit-proof manner, for example for the authorities.

If it is displayed to the operating person, for example by way of the display of a negative component evaluation result 11b during the running operation, that inadequate components (ingredients) are present for the preparation (weigh-in) of the respective medication at the workplace of the operating person, there is the possibility of the operating person obtaining these by way of ordering or by way of fetching this himself from the component store. Hereby, there is also the possibility of already comparing components for the next or next but one working step, so that an uninterrupted working of the operating person is rendered possible. Simultaneously, given the absence of components, an automatic ordering and delivery by third parties, e.g., store workers, is also conceivable.

A position acquisition means 12 acquires the precise location of the operating person, for example by way of a GPS sensor which is built into the smartglasses. In the case of absent components for a working step at the workplace of the operating person, the position acquisition means 12 is suitable for providing the operating person with a location evaluation result lid by way of a comparison of the component storage location data 10d which is stored on the memory means 7 and of the location data 6d of the current location of the operating person and for displaying a path to the respective component in the closest component storage space to the operating person.

It is possible at all times during the weighing of the medication for the operating person to retrieve the currently valid standard operating procedure (SOP) and for this to be represented in the display system 13. By way of the aforementioned sequences, a documentation according to good manufacturing practise (GMP) is ensured on weighing in the medicine.

Figure 3:
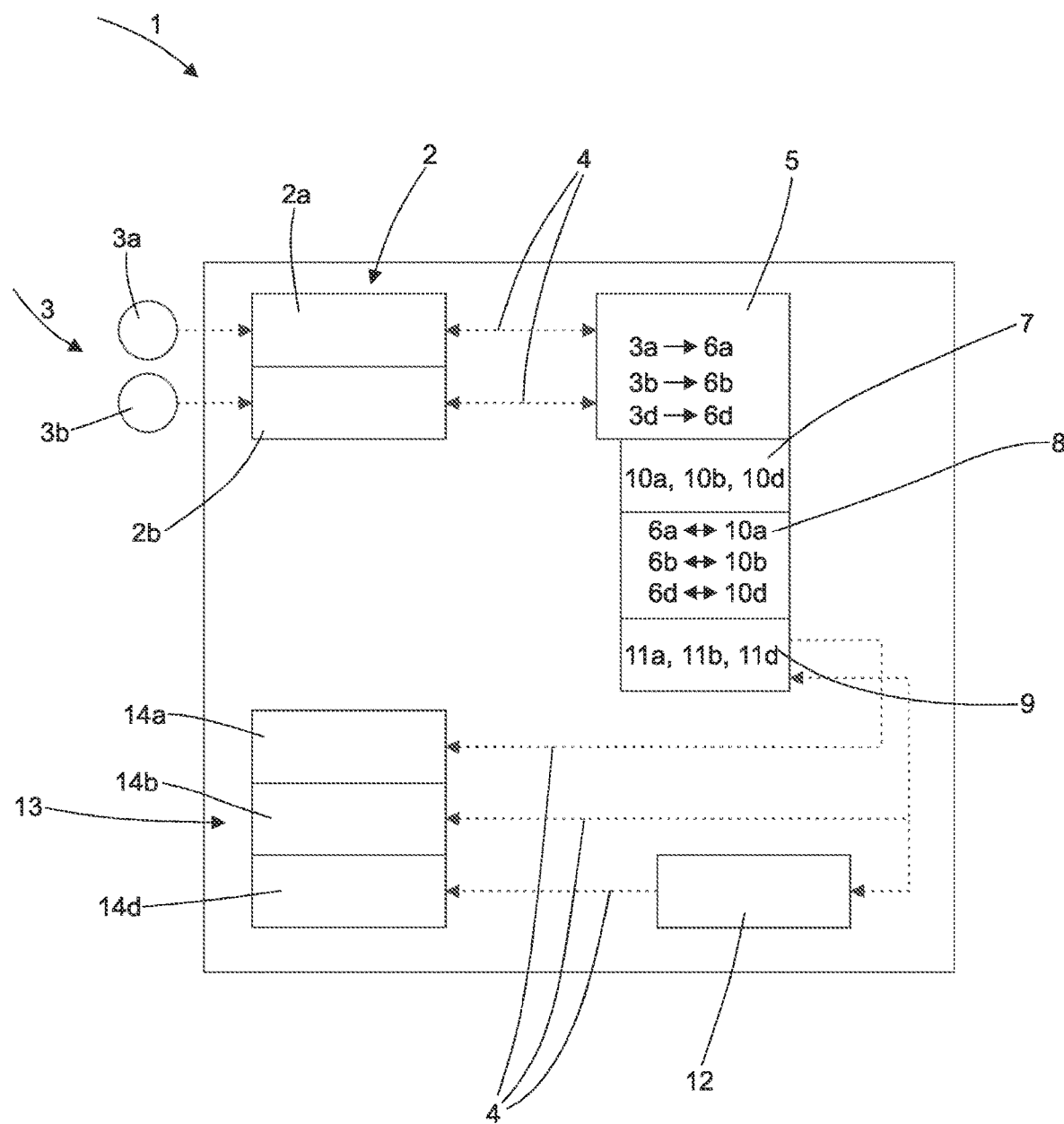

All data which is generated during the method is archived on the memory means 7 of the archiving system 1 in an audit-proof manner. FIG. 3 shows a basic flow diagram of a preferred archiving system 1 for the audit-proof archiving of electronic data for use in pharmaceutical logistics. The preferred archiving system 1 and the associated preferred method are to replace a "pick by voice" working procedure by a "pick by cam" working procedure.

The archiving system 1 is designed according to the archiving system 1 which is described in FIG. 1.

The third embodiment example of a preferred method for archiving electronic data is explained by way of the control of a pharmaceutical product in pharmaceutical logistics, wherein the method can be applied analogously also to the archiving of electronic data in other fields of logistics, apart from the pharmaceutical industry.

On equipping the packages, the operating person at his workplace carries for example smartglasses which are provided with a video camera, as an acquisition system 2. The acquisition system 2 as a working step acquisition unit 2a and a component acquisition unit 2b on the one hand acquires the working steps which are carried out by the operating person on equipping the package with respective medication, as working step raw data 3a and on the other hand the components (medications) which are present at the workplace and which are for equipping the package, as component raw data 3b. Subsequently to this, the acquired raw data 3 is transferred for example to a computer or the like via communication means 4. The data processing system 5 converts the acquired raw data 3 into actual value data 6, specifically into working step actual value data 6a and component actual value data 6b. The raw data 3 as well as the actual value data 6 is stored on the memory means 7 which are assigned to the data processing system 5, in an audio-proof manner.

Furthermore, desired value data 10, in particular working step desired value data 10a such as components desired value data 10b is stored in the memory means 7.

As working step data, preferably a list of the individual working steps which are to be carried out are stored on the memory means 7. By way of example, an order list can serve for this, wherein the working steps are not to be worked off in a certain sequence. The working steps, here the equipping of a package with a certain medication of an order list, can be freely selected until all medications which are contained on the order list are deposited in the package.

Preferably, pre-trained pictures of a medication which are stored in software are used in a suitable size (volume, mass or the like) as component desired value data 10b. The software recognises 3D objects in space in arbitrary positions and orientations by way of shape-based matching, thus by way of a comparison with a pre-trained picture.

Comparator means 8 access the actual value data 6, working step actual value data 6a and component actual value data 6b which is obtained from the raw data 3 and is stored on the memory means 7 and compare this to the desired value data 10, working step desired value data 10a and component desired value data 10b. The comparison is subsequently evaluated in the evaluation means 8 and an evaluation result 11 is provided in the form of a working step evaluation result 11a and a component evaluation result 11. A positive evaluation result 11 in contrast to at negative evaluation result 11 confirms a correct working procedure to the operating person. If the working step evaluation result 11a is positive then the individual working step was carried out correctly, for example all medications were packaged in the package. If the component evaluation result 11b is positive, then adequate components (medications) for the working step to be carried out are present at the workplace of the operating person on equipping the package. The evaluation result 11 in the form of a working step evaluation result 11 and a component evaluation result 11b is displayed to the operating person on a display unit 14 of the display system 13, said display unit being designed as a projection surface of the smartglasses or as a monitor.

Hence during the running process, it is possible for the operating person, for example by way of the display of a negative working step result 11a, to immediately recognise errors on putting together the package and to correct this. By way of this, each packet is equipped according to the specification and the data is simultaneously yet stored in an audit-proof manner, for example for the authorities, in the archiving system 1. Given an incorrect equipping of the packet, there is the possibility of indicating the error to the operating person by way of acoustic and/or optical signals.

Should it be displayed to the operating person, for example by way of the display of a negative component evaluation result 11b, that insufficient components for the equipping of the package are present at the workplace of the operating person, then there is the possibility of the operating person obtaining these, by way of ordering or fetching them himself from the component store. Hereby, there is also the possibility of already comparing the components for the next or next but one working step, so that an uninterrupted working of the operating person is rendered possible. At the same time, given the absence of components, an automatic ordering and delivery by the store worker is also conceivable.

A position acquisition means 12 acquires the precise location of the operating person, for example by way of a GPS sensor which is built into the smartglasses. In the case of absent components for a working step at the workplace of the operating person, the position acquisition means 12 is suitable for providing the operating person with a location evaluation result lid by way of a comparison of the component storage location data 10d which is stored in the memory means 7 and of the location data 6d of the current location of the operating person and to display to the operating person a path to the respective component in the closest component storage space. It is hence possible for the operating person to also not put the package together at the workplace, but per "pick and drop" directly in the store. On account of the position acquisition means 12 and the display system 13, the direct path to the next component to be packaged is optically and/or acoustically displayed to the operating person.

On account of the aforementioned sequences, a documentation corresponding to the "good manufacturing practise" (GMP) is ensured on putting together the package.

All data which is generated during the method is archived on the memory means 7 of the archiving system 1 in an audit-proof manner. Not only can the aforementioned method and the associated archiving system be used on equipping and putting-together packages with medications in the pharmaceutical industry, but also analogously with other packaging procedures, since by way of this an increased reliability of the correct composition procedure is achieved.

A further example for the use of the archiving system 1 is incoming goods inspection and the correct labelling of the good at the goods input which hereby occurs. The working steps are acquired by the working step acquisition unit 2a at the goods input control and additionally the inscribing of the label of the goods and/or the coding of the goods are acquired by way of the component acquisition unit 2b. The electronic data is compared to delivery data of the goods and is subsequently deposited in the archiving system 1 in an audit-proof manner.

The invention claimed is:

1. An archiving system for the archiving of electronic data, wherein the archiving system comprises memory for storing electronic data, a data processing system for processing the electronic data and an acquisition system which is designed as a working step acquisition unit for acquiring working step raw data, wherein the working step raw data are the working steps which are carried out in a process and the working step acquisition unit comprises one or more video cameras for acquiring the working step raw data, wherein the working step acquisition unit is connected to the data processing system and to the memory via data transfer, wherein the working steps of a process which are carried out are stored on the memory as working step desired value data, wherein the data processing system is configured to convert the working step raw data which is acquired by the working step acquisition unit into working step actual value data in the form of electronic data, to compare the working step actual value data to the working step desired value data, and to evaluate the comparison to generate an evaluation result in the form of electronic data, wherein the archiving system is configured to archive the electronic data on the memory of the archiving system in an audit-proof manner such that the archived electronic data is protected against subsequent modification and wherein the archived electronic data is indexed using metadata so that the archived electronic data can be retrieved from the memory of the archiving system such that a copy of the electronic data can be retrieved and used, wherein the acquisition system is a component acquisition unit or a weight acquisition unit, wherein the component acquisition unit is configured for acquiring component raw data, wherein the component raw data are the components which are present for the working step of a process which is carried out, and the weight acquisition unit is configured for acquiring weight raw data, wherein the weight raw data represents the weight of a component or an ingredient which is processed for the working step of a process which is carried out, and wherein the archiving system further comprises a display system which is connected to the data processing system via data transfer and which comprises a display unit configured to display the evaluation result.

2. The archiving system according to claim 1, wherein the components which are necessary for the working step of a process which is carried out are stored as component desired value data, a mass of a component which is metered is stored as weight desired value data, component storage locations of components are stored as component storage location desired value data, on the memory of the archiving system in the form of electronic data.

3. The archiving system according to claim 1, wherein the archiving system comprises a position acquisition unit which is connected to the data processing system via data transfer, for acquiring a current location of an operating person.

4. A method for archiving electronic data using an archiving system, wherein the archiving system comprises memory for storing electronic data, a data processing system for processing the electronic data, an acquisition system which is designed as a working step acquisition unit for acquiring working step raw data comprising the working steps carried out and component raw data or weight raw data, wherein the working step acquisition unit comprises one or more video cameras for acquiring the working step raw data, and a display system which is connected to the data processing system via data transfer and which comprises a display unit, wherein an acquisition step acquires the working step raw data, wherein a data processing step converts the working step raw data which is acquired by the working step acquisition unit into working step actual value data in the form of electronic data, compares the working step actual value data to working step desired value data stored in memory, and evaluates the comparison to generate an evaluation result in the form of electronic data, wherein an archiving step archives the electronic data on the memory of the archiving system in an audit-proof manner such that the archived electronic data is protected against subsequent modification, and indexes the archived electronic data using metadata so that the archived electronic data can be retrieved from the memory of the archiving system such that a copy of the electronic data can be retrieved and used, and wherein a display step displays the evaluation result on the display system.

5. The method according to claim 4, further comprising the steps:

acquiring component raw data or weight raw data and converting the component raw data or the weight raw data into component actual value data or weight actual value data, in the form of electronic data.

6. The method according to claim 5, wherein component desired value data or weight desired value data is stored on the memory, the method further comprising the steps of:

transferring the component actual value data or weight actual value data to the data processing system, carrying out a comparison of the component desired value data or the weight desired value data and component actual value data or weight actual value data of a process, evaluating the comparison of the component desired value data or weight desired value data and the component actual value data or weight actual value data of a process, and providing a data evaluation result.

7. The method according to claim 4, further comprising a position acquisition step of acquiring a current location of an operating person.

* * * * *